(12) United States Patent
Choi et al.

(10) Patent No.: US 9,977,571 B2
(45) Date of Patent: May 22, 2018

(54) METHOD AND APPARATUS FOR SHARING CONTENTS OF ELECTRONIC DEVICE

(71) Applicant: Samsung Electronics Co., Ltd., Gyeonggi-do (KR)

(72) Inventors: Bokun Choi, Seoul (KR); Doosuk Kang, Gyeonggi-do (KR); Piljoo Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 252 days.

(21) Appl. No.: 14/475,163

(22) Filed: Sep. 2, 2014

(65) Prior Publication Data

US 2015/0067534 A1    Mar. 5, 2015

(30) Foreign Application Priority Data

Sep. 2, 2013  (KR) ........................ 10-2013-0104603

(51) Int. Cl.
| | |
|---|---|
| *G06F 3/0482* | (2013.01) |
| *H04M 1/725* | (2006.01) |
| *H04L 12/58* | (2006.01) |
| *G06F 17/30* | (2006.01) |
| *G06F 3/0488* | (2013.01) |
| *G06F 3/0486* | (2013.01) |

(52) U.S. Cl.
CPC ........ *G06F 3/0482* (2013.01); *G06F 3/04883* (2013.01); *G06F 17/30165* (2013.01); *H04L 51/04* (2013.01); *H04M 1/72583* (2013.01); *G06F 3/0486* (2013.01); *H04M 1/72547* (2013.01); *H04M 2250/22* (2013.01)

(58) Field of Classification Search
CPC ... H04L 51/04; G06F 3/04883; G06F 3/0482; G06F 3/0486; G06F 17/30165; H04M 1/72547; H04M 1/72583; H04M 2250/22
See application file for complete search history.

(56) References Cited

U.S. PATENT DOCUMENTS

| | | | | |
|---|---|---|---|---|
| 2,863,356 A | * | 12/1958 | Goldberg | G03B 21/132 353/119 |
| 8,434,020 B2 | * | 4/2013 | Martyn | G06F 3/0482 715/808 |
| 2003/0076364 A1 | * | 4/2003 | Martinez | G06F 3/0481 715/810 |

(Continued)

FOREIGN PATENT DOCUMENTS

KR    1020010045591    6/2001

OTHER PUBLICATIONS

European Search Report dated May 7, 2015 issued in counterpart application No. 14183167.7-1972.

(Continued)

*Primary Examiner* — Justin R. Blaufeld
(74) *Attorney, Agent, or Firm* — The Farrell Law Firm, P.C.

(57) ABSTRACT

A method of and apparatus for sharing contents of an electronic device are provided. The method includes displaying contents; if a touch input for sharing the contents is generated, displaying an application list including applications and an execution item for each application which displays a number of contents previously shared with an application; if an execution item of an application in the application list is selected, sharing the contents with an application, and updating and displaying the execution item.

9 Claims, 19 Drawing Sheets

(56) References Cited

U.S. PATENT DOCUMENTS

| | | | |
|---|---|---|---|
| 2009/0305732 A1 | 12/2009 | Marcellino et al. | |
| 2011/0083111 A1* | 4/2011 | Forutanpour | G06F 1/1694 |
| | | | 715/863 |
| 2011/0225539 A1 | 9/2011 | Lee et al. | |
| 2012/0290680 A1 | 11/2012 | Hwang | |
| 2013/0176377 A1 | 7/2013 | Ho | |
| 2013/0212470 A1 | 8/2013 | Karunamuni et al. | |
| 2013/0332855 A1* | 12/2013 | Roman | G06F 3/0481 |
| | | | 715/753 |
| 2014/0040764 A1* | 2/2014 | Stoop | G06F 3/0484 |
| | | | 715/748 |
| 2014/0372902 A1* | 12/2014 | Bryant | G06F 17/30029 |
| | | | 715/748 |

OTHER PUBLICATIONS

European Search Report dated Jan. 22, 2015 issued in counterpart application No. 14183167.7-1972.

* cited by examiner

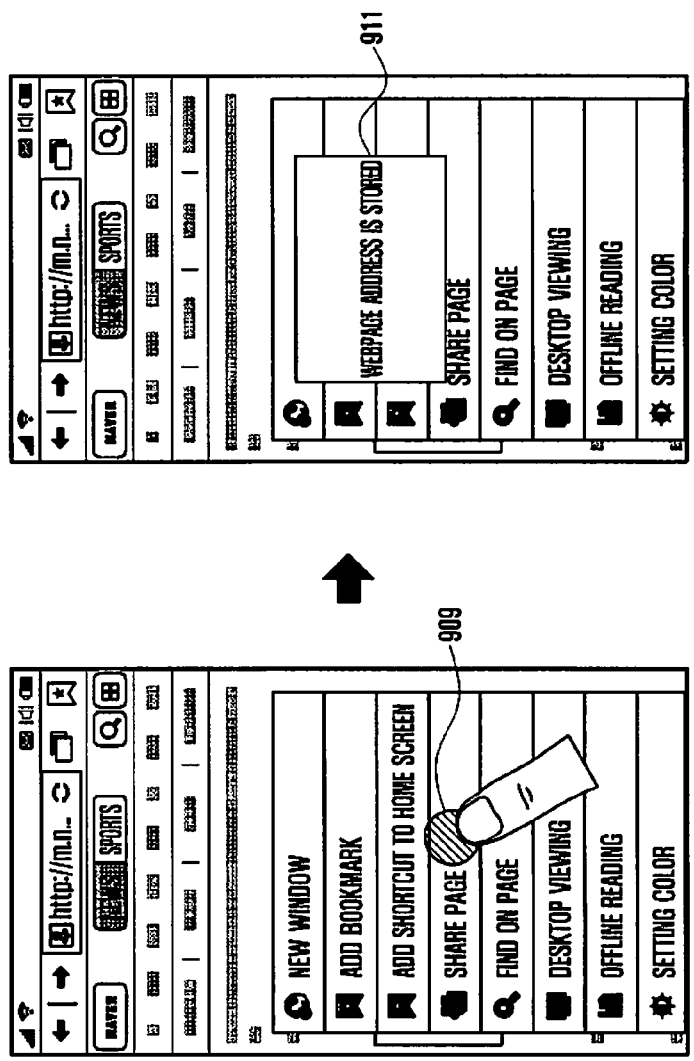

METHOD AND APPARATUS FOR SHARING CONTENTS OF ELECTRONIC DEVICE

PRIORITY

This application claims priority under 35 U.S.C. § 119(a) to a Korean Patent Application, filed on Sep. 2, 2013 and assigned Serial No. 10-2013-0104603, the entire contents of which are incorporated herein by reference.

BACKGROUND

1. Field of the Invention

The present invention relates generally to a method and an apparatus for processing contents of an electronic device, and more particularly, to a method and an apparatus for sharing a plurality of contents.

2. Description of the Related Art

Currently, with the development of a digital technology, an electronic device such as a smart phone, a tablet Personal Computer (PC), etc., which can perform mobile communication and personal information processing, has been rapidly popularized. Such an electronic device provides convenience through various applications such as a camera for photographing an image or recording a video, a game, a word processor, E-mail, Internet access, etc.

Furthermore, the electronic device can share various contents such as an image, audio, video, text, etc. with other electronic devices via a content sharing application. For example, a user can not only view an image in a gallery but also photograph it and transmit a copy of the photograph to another user.

In particular, the development of Internet communication has enabled electronic devices to share diverse contents. Furthermore, as a display screen of an electronic device has gotten larger, a plurality of contents may be displayed on one display screen, and if desired, contents (e.g. audio, video, a picture, a document, a map, etc.) may be shared via various applications (e.g. ChatOn, KakaoTalk, E-mail, etc.).

While current methods exist for sharing contents in an electronic device with other users, the methods are inconvenient, because repeated selection and transmission is required.

SUMMARY

The present invention has been made to address the above-mentioned problems and disadvantages, and to provide at least the advantages described below. Accordingly, an aspect of the present invention provides a method of and an apparatus for sharing contents of an electronic device.

In accordance with an aspect of the present invention, a method of sharing contents of an electronic device is provided. The method includes displaying contents; if a touch input for sharing the contents is generated, displaying an application list including applications and an execution item for each application which displays a number of contents previously shared with the application; and if an execution item of an application in the application list is selected, sharing the contents with the application, and incrementing and displaying the execution item.

In accordance with another aspect of the present invention, a method of sharing contents of an electronic device is provided. The method includes displaying contents; detecting a touch input for sharing the contents; storing the displayed contents to a share buffer, in response to the touch input; if an input to share is detected, displaying contents and applications of the share buffer; sharing the contents of the share buffer with the application; and if the application is executed, processing the shared contents.

In accordance with another aspect of the present invention an apparatus of sharing contents of an electronic device is provided. The apparatus includes a touch screen that displays contents and detects a touch input for sharing the contents; and a controller configured to cause contents to be displayed on the touch screen, an application list to be displayed on the touch screen and an execution item associated with each application which indicates a number of contents shared which can be shared if a touch input for sharing the contents is detected, and to share the contents with an application and increment and display the execution item if an execution item of a specific application is selected from the application list.

In accordance with another aspect of the present invention, an apparatus for sharing contents of an electronic device is provided. The apparatus includes a touch screen that displays contents and detects a touch input for sharing the contents; and a controller configured to cause contents to be displayed on the touch screen, to store the displayed contents to a share buffer in response to the touch input if the touch input for sharing the contents is detected, to display, on the touch screen, contents and applications of the share buffer if an input for sharing is detected, and to share the contents of the share buffer with an application via a drag-and-drop gesture to process the shared contents via the application.

BRIEF DESCRIPTION OF THE DRAWINGS

The above and other aspects, features and advantages of the present invention will be more apparent from the following detailed description, taken in conjunction with the accompanying drawings, in which:

FIGS. 9A to 9D illustrate a method of sharing contents according to an embodiment of the present invention.

DETAILED DESCRIPTION OF EMBODIMENTS OF THE PRESENT INVENTION

Figure 1:
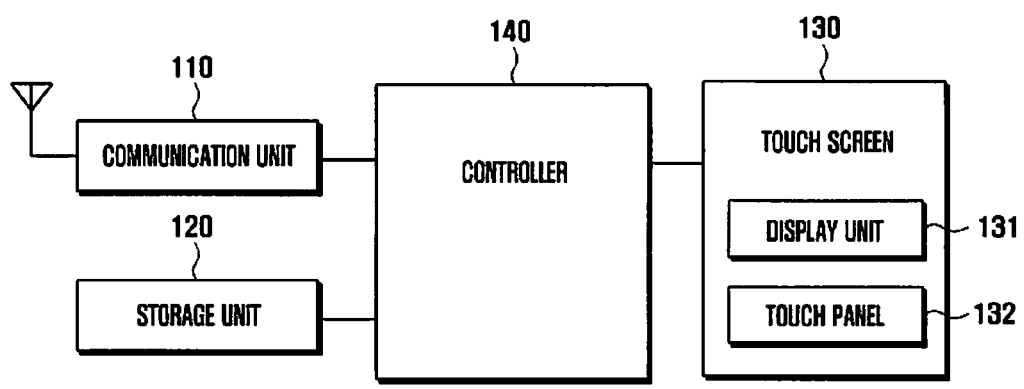
FIG. 1 is a block diagram of an electronic device according to an embodiment of the present invention.

Hereinafter, embodiments of the present invention are described with reference to the accompanying drawings. It should be noted that like elements are designated with like reference numerals although they are shown in different drawings. Furthermore, descriptions of well-known functions or configurations that would unnecessarily obscure the present invention are omitted.

Hereinafter, embodiments of the present invention are described with reference to the accompanying drawings to explain the present invention, and to facilitate comprehension of the present invention, but are not intended to limit the scope of the present invention. It will be apparent to those having ordinary skill in the art to which the present disclosure pertains that various changes and modifications of the embodiments described herein may be made without departing from the scope and spirit of the present invention.

An electronic device according to an embodiment of the present invention can share contents with an application that were generated and processed by the same, or different, type of application. The contents may include audio, video, an image, a document, an E-book, a map, etc., and the application with which contents are shared may be a transmission application. The transmission application may include an E-mail application, a Multimedia Messaging Service (MMS) application, a Social Network Service (SNS) application, a short range communication application, etc. The short range communication application corresponds to an application for executing device-to-device communication, and may include an application for performing a communication standard such as Bluetooth, Near Field Communication (NFC), or Wireless Fidelity (Wi-Fi) Direct.

In an embodiment of the present invention, an "execution item" implies a count area within an application in which the number of contents shared with the application (i.e., executed contents) is displayed. The number of contents shared with the application is identified by the execution item. In addition, if a touch input for sharing contents is detected on a touch screen on which contents are displayed, the contents are stored in a share buffer, and when a gesture for adding contents to an application is detected on the touch screen on which contents are displayed, the number of contents displayed in the execution item is updated and displayed.

The electronic device according the present invention may be a mobile communication terminal, a smart phone, a tablet Personal Computer (PC), a hand-held PC, a Portable Multimedia Player (PMP), a Personal Digital Assistant (PDA), a notebook PC, etc.

FIG. 1 is a block diagram of an electronic device 100 according to an embodiment of the present invention.

Referring to FIG. 1, the electronic device 100, according to an embodiment of the present invention, includes a communication unit 110, a storage unit 120, a touch screen 130, and a controller 140.

The communication unit 110 may perform a voice call, a video call, or a data communication with an external device via a network. The communication unit 110 includes a Radio Frequency (RF) transmitter that up-converts and amplifies a frequency of a signal to be transmitted, and an RF receiver that low-noise amplifies a received signal and down-converts a frequency of the received signal. Furthermore, the communication unit 110 includes a modulator and a demodulator. The modulator and the demodulator provide communication according to a communication standard such as Code Division Multiple Access (CDMA), Wideband Code Division Multiple Access (WCDMA), Long Term Evolution (LTE), Wi-Fi, Wireless Broadband Internet (Wi-Bro), Bluetooth, Near Field Communication (NFC), etc. The communication unit 110 may be a mobile communication module, an Internet communication module, and/or a short range communication module.

The storage unit 120 includes a program memory for storing an operation program of the electronic device 100 and a data memory for storing data generated while a program of the electronic device 100 is executed.

The touch screen 130 is an integral type touch screen which includes a display unit 131 and a touch panel 132. The display unit 131 displays various screens according to the use of the electronic device 100, under the control of the controller 140. The display unit 131 may be a Liquid Crystal Display (LCD), an Organic Light Emitting Diode (OLED), or an Active Matrix Organic Light Emitting Diode (AMO-LED). The touch panel 132 may be a composite touch panel including a hand touch panel for detecting a hand gesture and a pen touch panel for detecting a pen gesture.

In an embodiment of the present invention, the display unit 131 displays a contents screen. The contents screen displayed on the display unit 131 detects a touch input for sharing contents, via the touch panel 132. The display unit 131 displays an application list and a number of contents included in the application and desired to be shared, under a control of the controller 140, in response to the touch input.

The controller 140 controls an overall operation of the electronic device 100, a signal flow between internal components of the electronic device 100, a processing of data, and possibly the supply of electric power from a battery to the components of the electronic device 100.

In an embodiment of the present invention, the controller 140 causes a display of a contents screen on the display unit 131, wherein the contents screen detects an input to share contents via the touch panel 132. If an input to share contents is detected via the touch panel 132, the controller 140 displays an application list on the display unit 131. The controller 140 adds the contents corresponding to the input to share contents to an application selected via the touch panel 132 from the displayed application list. The controller 140 processes the contents by transmitting the contents shared with the application to another electronic device via the application.

In addition, the electronic device 100 further includes a Global Positioning System (GPS) module for receiving location information, an audio processing unit including a microphone and a speaker, a camera module for photographing an image and recording video, an input unit for receiving an from a hard key, etc.

A method of sharing contents according to an embodiment of the present invention includes sharing executed contents with an application, and the application further sharing the contents, upon execution of the application, with another electronic device. That is, if an input is received to execute the contents, the controller 140 displays an application list, including applications which can share the contents, and if an application is selected from the application list, the contents are shared with, or executed to, the selected application. After the contents are shared, or executed, with the selected application, a number indicating the number of contents shared with the selected application is incremented and displayed in the execution item of the corresponding application. If an input is received to process the contents, the contents are stored and accumulated in a share buffer, and maintained until being processed via a selected application. If a user input is detected that selects an application for sharing contents with another electronic device, the controller 140 displays the contents shared with the selected application, where one or more of the contents may be selected by the user for processing.

A method of sharing contents according to an embodiment of the present invention includes storing selected contents in a buffer, and selecting the contents stored in the buffer by an application to collectively process the selected contents. That is, the contents are selected to be temporarily stored in the buffer (e.g. the share buffer). The share buffer stores the contents selected using the aforementioned method. The contents stored in the share buffer are shared with a selected application, and are then processed via the selected application.

The aforementioned method of sharing and processing contents are described in detail below with reference to the accompanying drawings.

Figure 2:
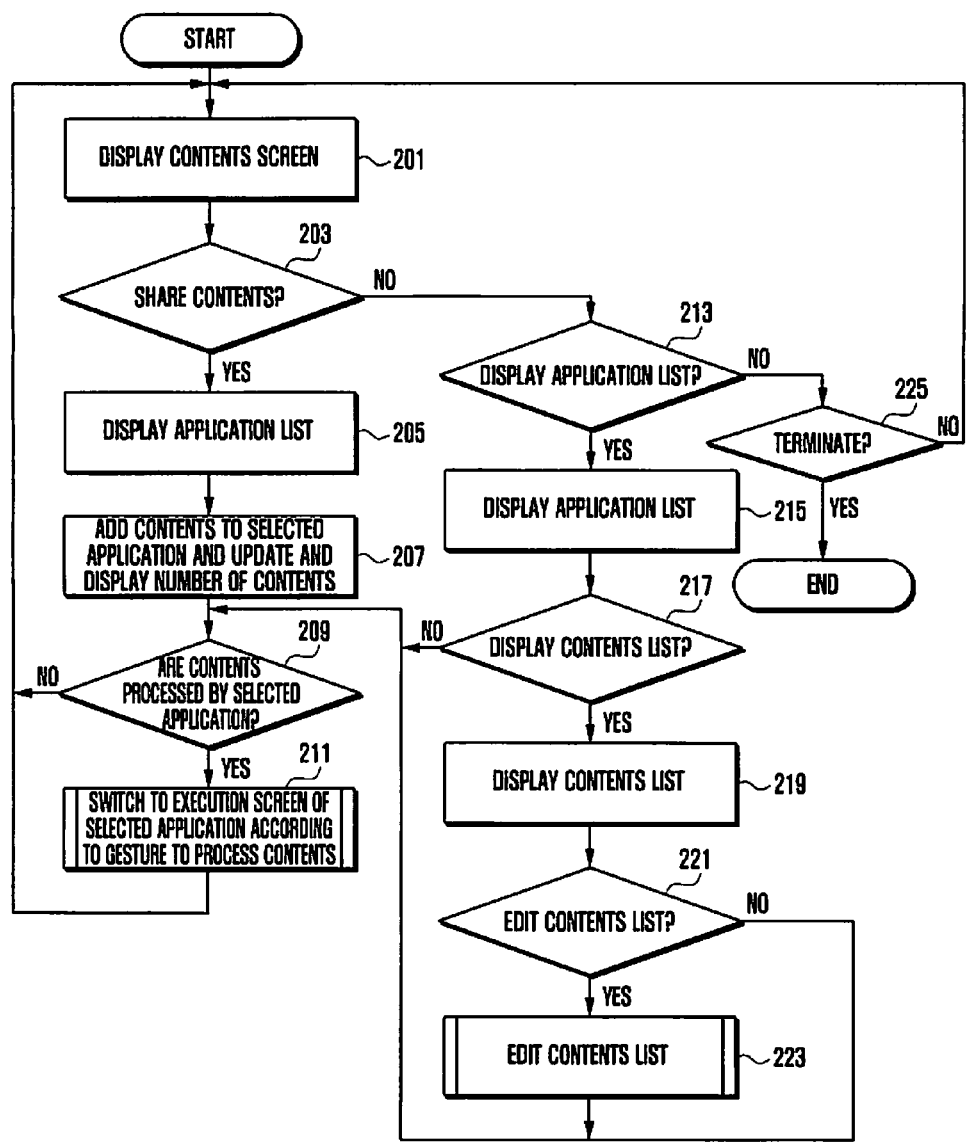
FIG. 2 is a flowchart of a method of sharing contents according to an embodiment of the present invention.

FIG. 2 is a flowchart of a method of sharing contents according to an embodiment of the present invention. FIGS. 3A to 3E illustrate an example of the method of sharing contents according to FIG. 2.

Referring to FIG. 2 and FIGS. 3A to 3E, in step 201, the controller 140 causes a contents screen to be displayed on the display unit 131. The contents screen corresponds to a screen of an application being executed, and may correspond to an execution screen of an application such as a music application, a video application, an E-book application, an Internet application, a map application, etc. The contents screen, according to the corresponding application execution, may be displayed while being configured by a text, an image, a video, etc. In an embodiment of the present invention, if an input for sharing contents (e.g. a text, an image, a video, etc.) is generated in the contents screen, the controller 140 add/shares the contents to/with a selected application (e.g. an E-mail application, an SNS, etc.). The controller 140 processes the shared contents by causing the shared contents to be transmitted to another electronic device via the selected application.

In step 203, the controller 140 determines whether an input for sharing contents is detected on the contents screen displayed on the display unit 131. In an embodiment of the present invention, if a touch input is generated in a share menu in a screen 301 of FIG. 3A, a share icon 317 of FIG. 3B, or an icon 327 of FIG. 3C, it can be determined that an input for sharing contents is detected. If the input for sharing contents is detected, the controller 140 stores the contents in a share buffer. The controller 140 can cause multiple contents stored in the share buffer to be shared by one command via a selected application. Further, the controller 140 maintains the contents in the share buffer until the contents are processed via the selected application. If the input for sharing contents is detected, the controller 140 displays, on the display unit 131, an application list including the execution item which displays whether or not multiple contents are to be shared, in step 205. The number of contents shared with the respective applications displayed in the applications list is identified by the corresponding execution item. The application list includes all applications which can share contents, such as SNSs (e.g. Facebook, Twitter, etc.) and messengers (e.g. ChatOn, KakaoTalk, etc.), or short range communications (e.g. Bluetooth, NFC, or Wi-Fi Direct, etc.). Furthermore, the application list may be arranged and displayed in a form of at least one of an icon, a thumbnail, and a list. In the accompanying drawings, the application list is displayed in a form of a list. However, the present invention is not limited to displaying the application list as a list. Next, the controller 140 detects an input for adding contents, from a selected application. If the input for adding contents is detected from a selected application, the controller 140 add contents to the selected application, and displays the total number of contents that have been added to the selected application in an application count area (i.e. the execution item), in step 207. The step of adding contents to an application may be repeated, and the contents may be added more than one application (i.e., more than one application may be selected). Furthermore, if the contents are added to a selected application, the number of contents displayed on the application count area corresponding to the selected application is updated and displayed.

Figure 3A:
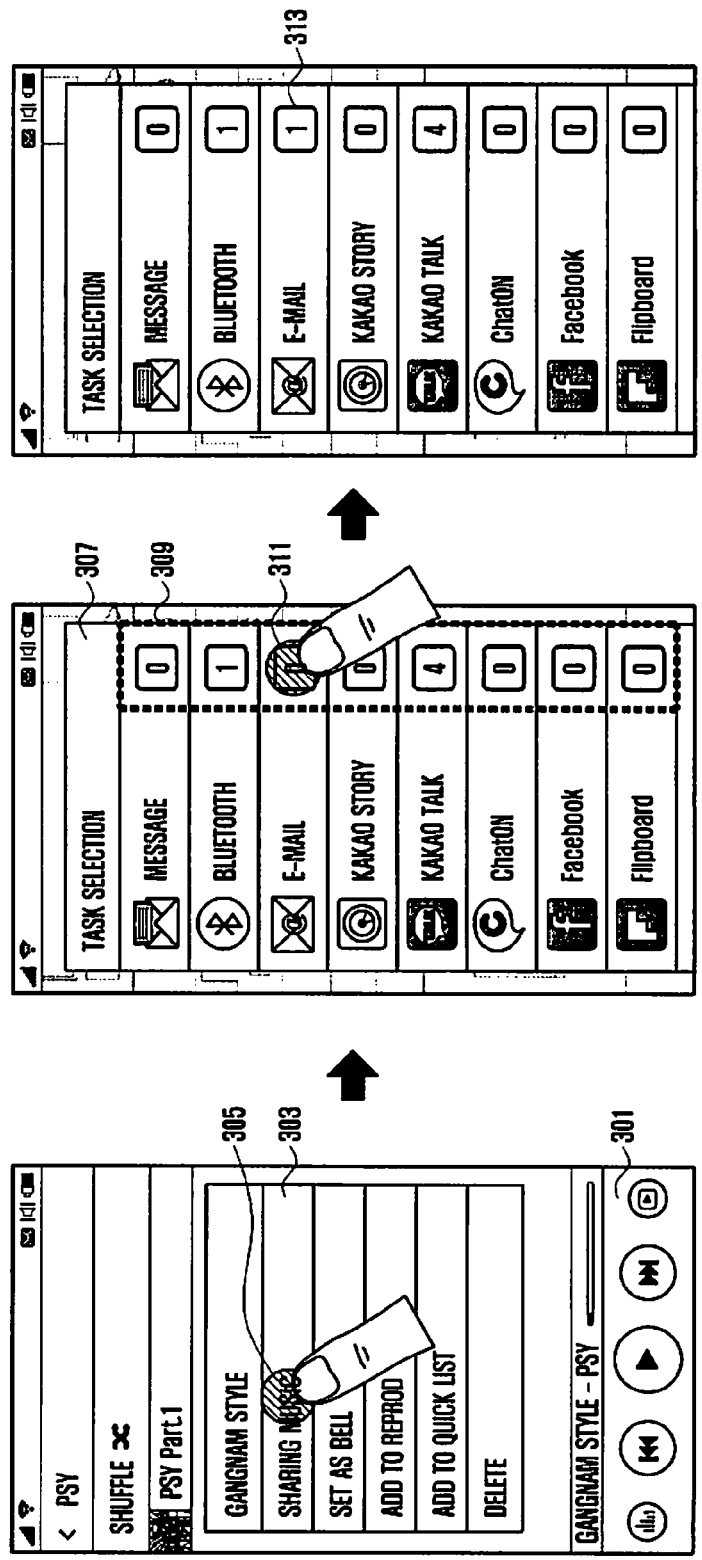
FIGS. 3A to 3E illustrate a method of sharing contents according to an embodiment of the present invention.

For example, if a touch input is generated at a "music share" item 303 in a menu relating to music contents in the screen 301 of FIG. 3A as indicated by reference numeral 305, the controller 140 stores the music contents in the share buffer and displays an application list 307. The controller 140 detects an input for adding the contents to a selected application in the application list 307. The contents may be added to at least one application in the application list 307, and as the contents are added to an application, the number of contents associated with an application and displayed in a corresponding application count area 309 is updated and displayed. In FIGS. 3A to 3E, the contents are added and/or shared via an E-mail application. However, the present invention is not limited to selecting an E-mail application.

Referring to FIG. 3A, the number of contents associated with the E-mail application in the application list 307 is initially zero. After a touch input for adding music contents to the application count area 309 is generated, as indicated by reference numeral 311, the number of contents shared with the selected E-mail application is changed from zero to one, as indicated by reference numeral 313, and is displayed. The present invention is not limited thereto, and the music contents may be added to other applications (e.g. Bluetooth, ChatOn, etc.) as well as the E-mail application.

In step 209, the controller 140 determines whether a touch input for processing contents by a selected application is detected. If the touch input for processing the contents is not generated, the controller 140 repeats step 201 to step 207.

Figure 3B:
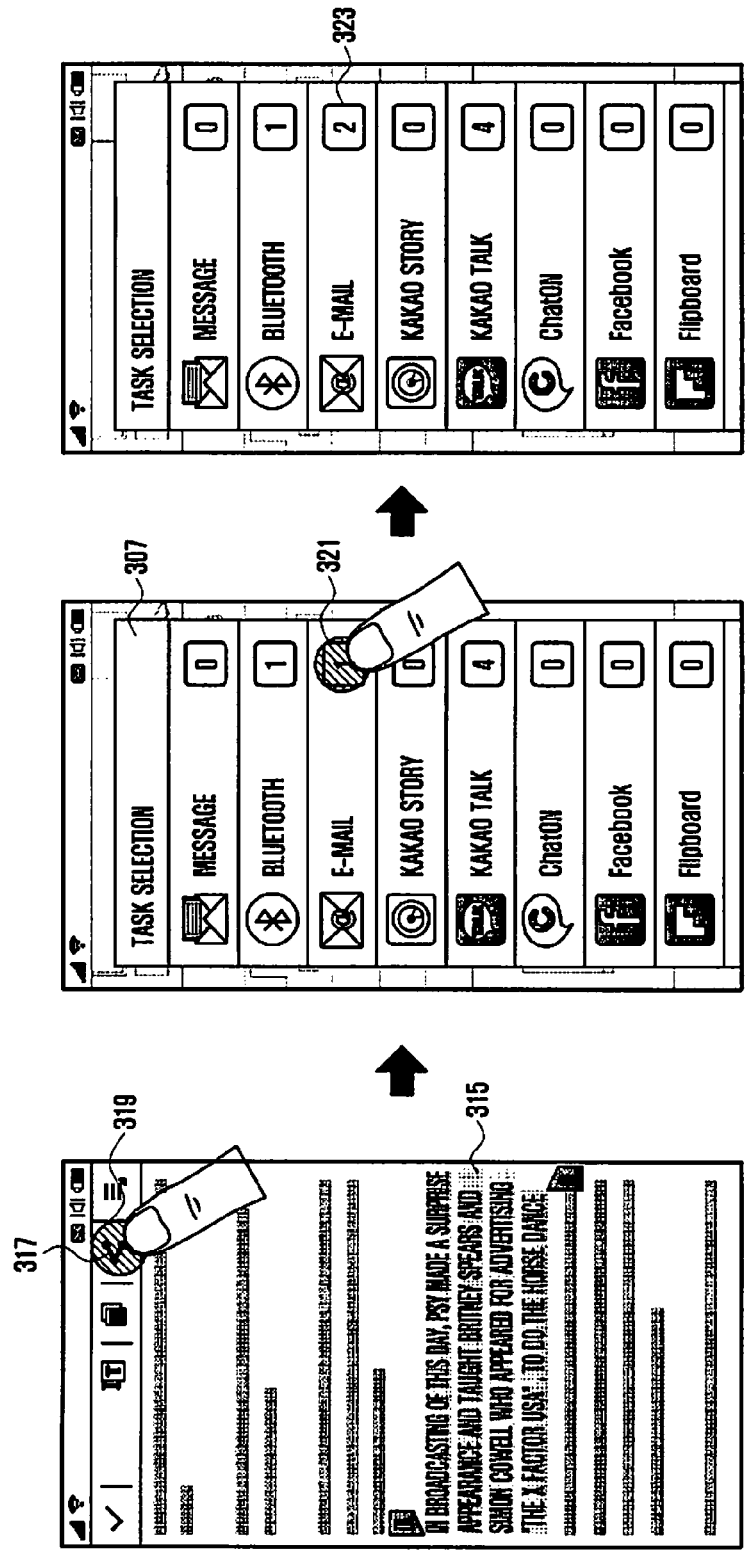

For example, the controller 140 detects a touch input on a share icon 317 in a screen including text contents indicated by reference numeral 315 of FIG. 3B, via the touch panel 132. If a touch input is generated on the share icon 317 as indicated by reference numeral 319, the controller 140 stores the text contents in the share buffer, and displays an application list 307 on the display unit 131. If a touch input for adding the text contents to an E-mail application in the application list 307 is generated as indicated by reference numeral 321, the controller 140 adds the text contents to the E-mail application. The controller 140 changes the number of sharable contents from one to two and displays the changed number of sharable contents, as indicated by reference numeral 323, by adding the text contents to the E-mail application. The present invention is not limited thereto, and the text contents may be added to other applications (e.g. Bluetooth, ChatOn, etc.) as well as the E-mail application.

Figure 3C:
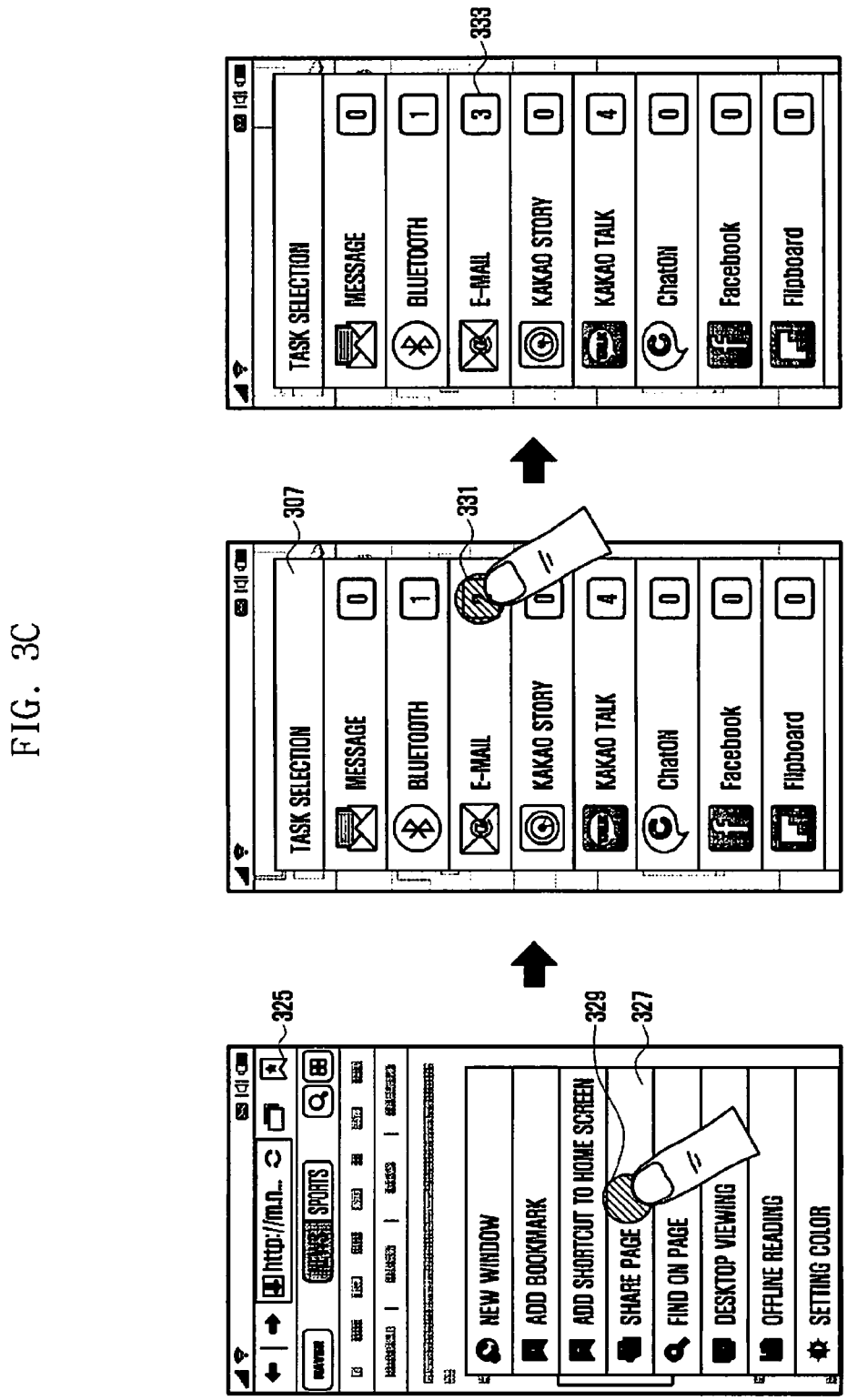
Figure 3D:
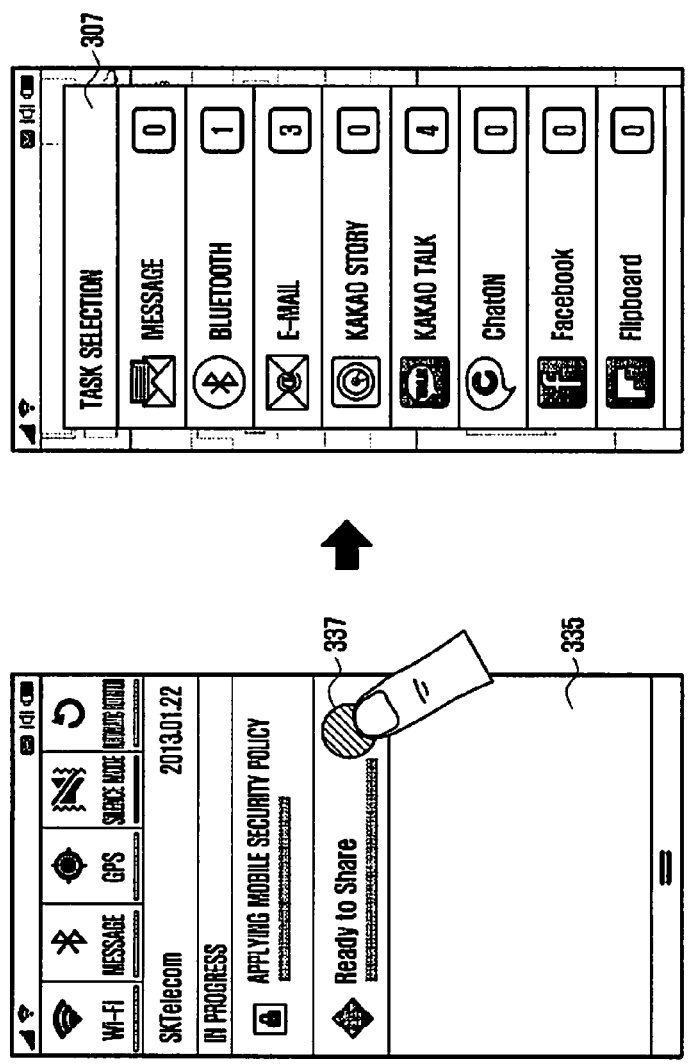
Figure 3E:
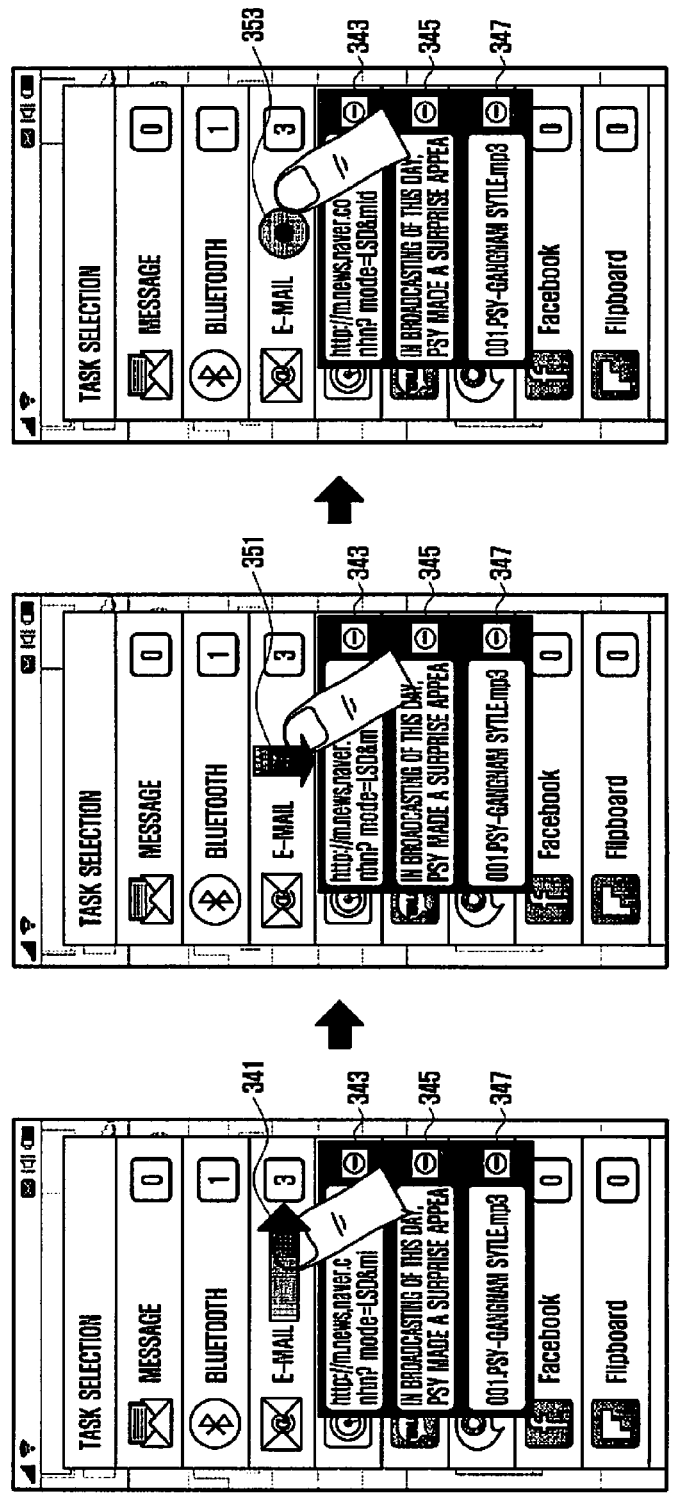

Next, the controller 140 detects a touch input on a page share item 327 in a web page screen 325 of FIG. 3C, via the touch panel 132. If a touch input is generated on the page share item 327 as indicated by reference numeral 329, the controller 140 stores the web page in the share buffer, and displays the application list 307 on the display unit 131. If a touch input for adding the web page to the E-mail application in the application list 307 is generated as indicated by reference numeral 331, the controller 140 adds the web page to the E-mail application. The controller 140 changes the number of shamble contents from two to three and displays the changed number of shamble contents, by adding the web page to the E-mail application, as indicated by reference numeral 333. The present invention is not limited thereto, and the web page may be added to other applications (e.g. Bluetooth, ChatOn, etc.) as well as the E-mail application.

The aforementioned steps may be repeated, and a plurality of contents may be added to a plurality of applications. The plurality of added contents may then be processed by an application selected via a process described below. Although it is assumed and described in an embodiment of the present invention that the shared contents store and/or share music, a text and a web page, the present invention is not limited thereto, and the shared contents may include a map, an image, etc.

In step 209, if an input for processing the shared contents by a selected application is generated, the controller 140, in step 211, switches to an execution screen of an application selected according to a detected user's gesture and processes the shared contents.

Step 211 which switches to the execution screen of the application selected according to the user's gesture and processes the contents is described in detail with reference to FIG. 4 and FIGS. 5A and 5B.

Figure 4:
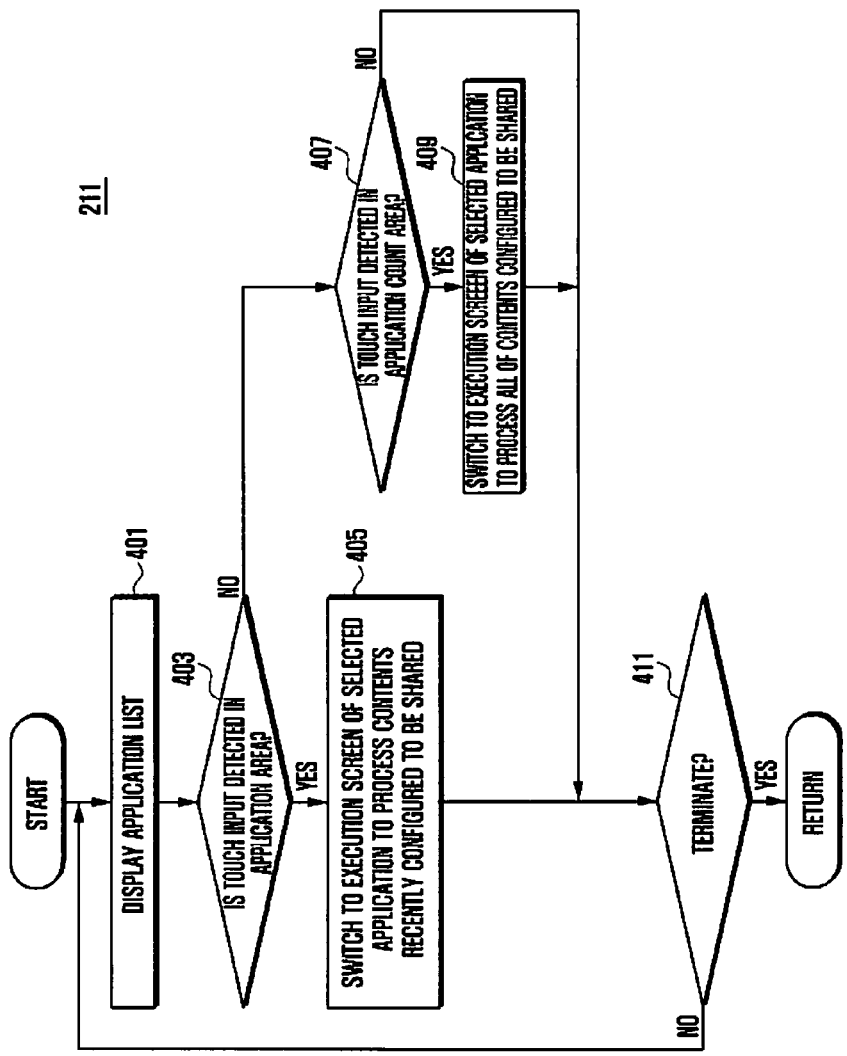
FIG. 4 is a flowchart of a method of sharing contents with a gesture according to an embodiment of the present invention.

FIG. 4 is a flowchart of a method of sharing contents according to a gesture according to an embodiment of the present invention. FIGS. 5A and 5B illustrate a method of sharing contents according to a gesture.

Figure 5A:
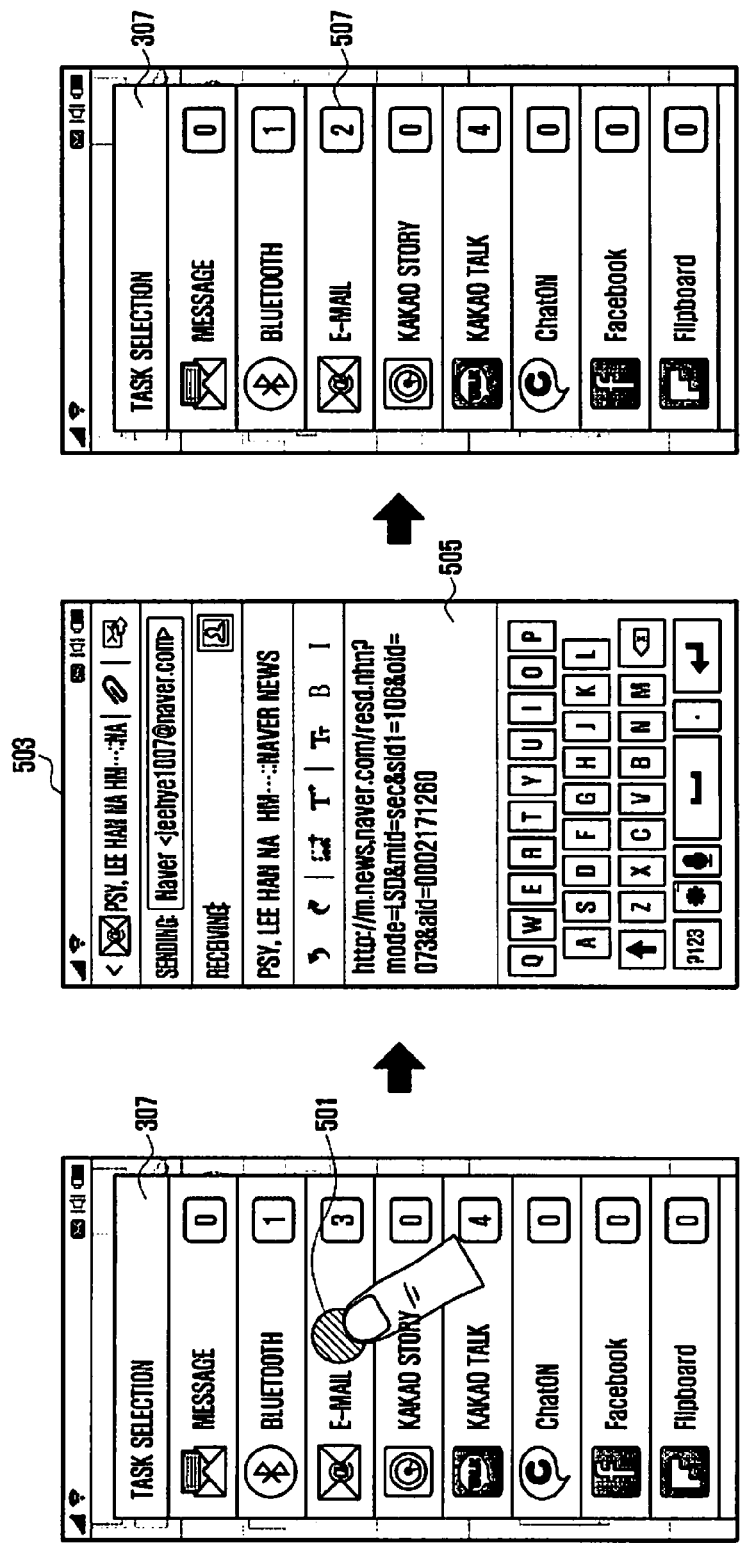
FIGS. 5A and 5B illustrate a method of sharing contents with a gesture.
Figure 5B:
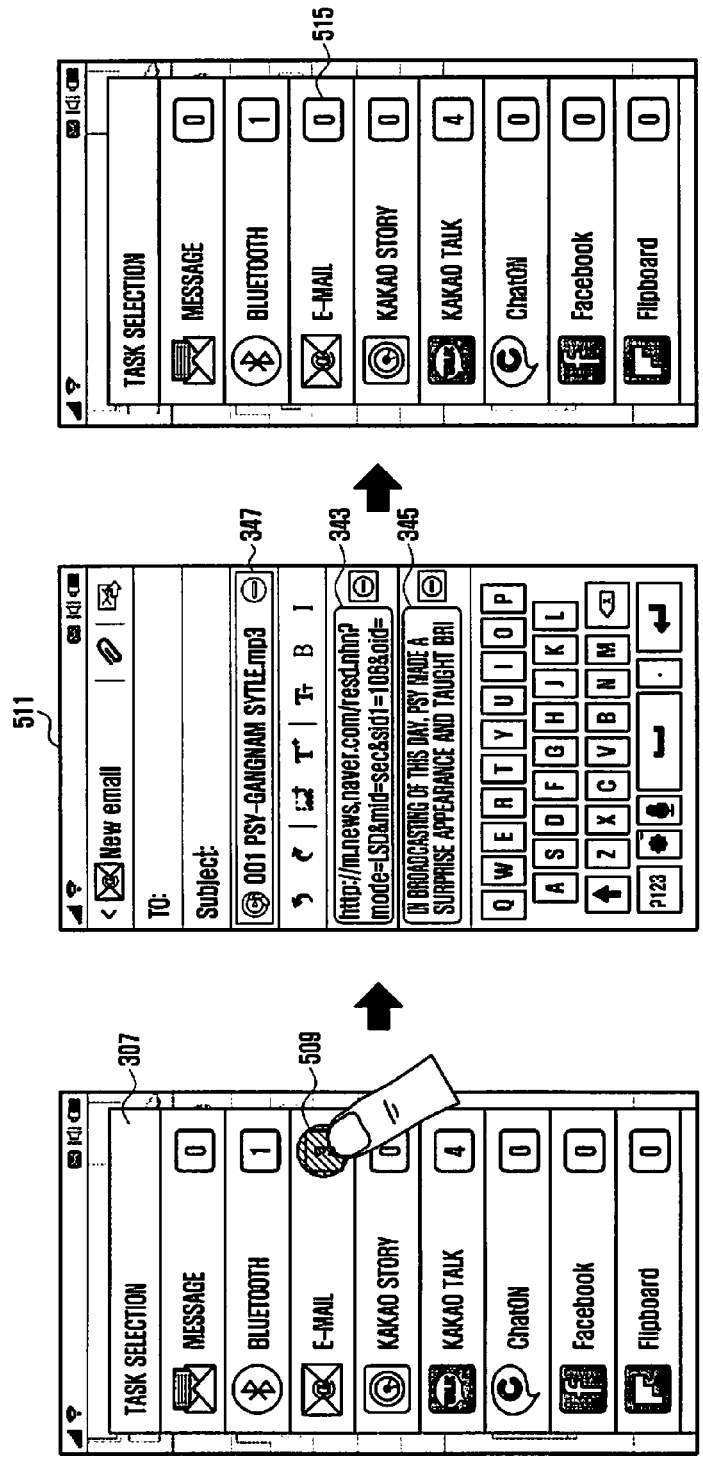

Referring to FIG. 4 and FIGS. 5A and 5B, the controller 140, in step 401, displays the application list 307 of FIG. 5A on the display unit 131. If a touch input is generated on an application area in the application list 307, the controller 140 processes contents recently configured to be shared, via the application on which the touch input is generated. If a touch input is generated on an application count area in the application list 307, the controller 140 processes all of the contents configured to be shared, via the application on which the touch input is generated.

The controller 140 detects a touch input on an application area in the application list 307 via the touch panel 132. The touch input may be a tap input, but is not limited thereto. If a tap input is detected on the E-mail application as indicated by reference numeral 501 of FIG. 5A, the controller 140, in step 405, switches to an execution screen of the E-mail application as indicated by reference numeral 503 to process the contents as indicated by reference numeral 505 and transmits contents recently configured to be shared with another electronic device. If processing of the contents is complete, the controller 140 updates the number of contents which can be shared by the E-mail application and displays the updated number as two, as indicated by reference numeral 507 of FIG. 5A.

Alternatively, the controller 140 may detect a touch input on a count area of an application in the application list 307. The touch input may be a long press, but is not limited thereto. If a long press is detected on a count area of the E-mail application as indicated by reference numeral 509 of FIG. 5B, the controller, in step 409, switches to an execution screen of the E-mail application to process the contents and to transmit all of the contents to be shared (e.g. a web page address 343, a text content 345 and a music content 347) with another electronic device, as indicated by reference numeral 511. If processing of the contents is complete, the controller 140 updates the number of contents which can be shared by the E-mail application and displays the updated number as zero, as indicated by reference numeral 515 of FIG. 5B.

If the contents are processed via the E-mail application, the controller 140, in a case where the contents correspond to text contents (e.g. a Uniform Resource Locator (URL) address), the contents may be shared while being added to a body text area, or in a case where the contents correspond to file contents (e.g. a music file, a video file, a picture file, etc.), the contents may be shared while being added to a file. Furthermore, the added contents may be modified on an E-mail writing screen.

After processing the contents according to the user's gesture, the controller 140, in step 411, detects a command that terminates the processing of the contents. If the terminating command is not generated, the controller 140 branches off to step 401 to display the application list 307 on the display unit 131.

If the terminating command is generated, the controller 140 returns to FIG. 2 to display the contents screen on the display unit 131.

If the touch input for sharing the contents is not generated in step 203, the controller 140 determines whether a gesture for displaying the application list 307 is detected. The gesture for displaying the application list 307 may be a drag gesture from a bezel area into the touch panel 132, a drag gesture from the touch panel 132 into the bezel area, or any other suitable gesture. Furthermore, the application list 307 may be displayed via an indicator bar displayed via a drag gesture from the upper side toward the lower side. In an embodiment of present invention, the application list 307 is displayed via a share function displayed in the indicator bar. However, the present invention is not limited thereto.

If the gesture for displaying the application list 307 is detected, the controller 140 detects the gesture in step 213, and displays the application list 307 in step 215. For example, if the drag gesture from the upper side toward the lower side is generated, the controller 140 displays the indicator bar on the display unit 131 as indicated by reference numeral 335 of FIG. 3D. If the contents are stored in the share buffer while not being processed, share items may be displayed in the indicator bar. If a touch input is generated in the share item displayed in the indicator bar, as indicated by reference numeral 337 of FIG. 3D, the controller 140 switches to a screen which displays the application list 307.

The operation of displaying the application list 307 via the share item displayed in the indicator bar may be performed if a user wants to process the contents configured to be shared while performing another operation. That is, the shared contents may be processed when necessary.

Furthermore, the controller 140 detects a gesture for identifying a contents list including the shared contents, from the application list 307 displayed on the display unit 131, in step 217. The gesture may include a flick gesture from the left side to the right side as indicated by reference numeral 341 of FIG. 3E, a flick gesture from the upper side to the lower side as indicated by reference numeral 351 of FIG. 3E, and a hovering gesture as indicated by reference numeral 353 of FIG. 3E, but is not limited thereto. In an embodiment of the present invention, the contents list is displayed if the flick gesture from the left side to the right side is detected as indicated by reference numeral 341 of FIG. 3E. However, the present invention is not limited thereto. If a gesture for identifying the contents list including the shamble contents is not detected, the controller 140 branches off to step 209 to process the contents.

If a gesture for identifying the contents list including the shared contents is detected in the application list 307 display on the display unit 131, the controller 140, in step 219, displays the contents list. The contents list may be displayed in the order in which the contents included therein are stored, but is not limited thereto. Further, the contents list may be displayed according to size, file name, etc.

For example, if a flick gesture from the left side to the right side is detected in one application area in the application list 307 displayed on the display unit 131, the controller 140 displays a contents list including contents configured to be shared (e.g., a web site address 343, text contents 345 and music contents 347). Functions such as deleting contents, adding contents, editing contents, etc. may be performed via the displayed contents list.

The controller 140, in step 221, determines whether an input for editing the contents list is detected in the displayed contents list. If the input for editing the contents list is not detected, the controller 140 may branch off to step 209 to process the contents by a specific application.

Meanwhile, if the input for editing the contents list is detected, the controller 140, in step 223, edits the contents list. Step 223 which edits the contents list is described in detail with reference to FIG. 6 and FIGS. 7A to 7C.

Figure 6:
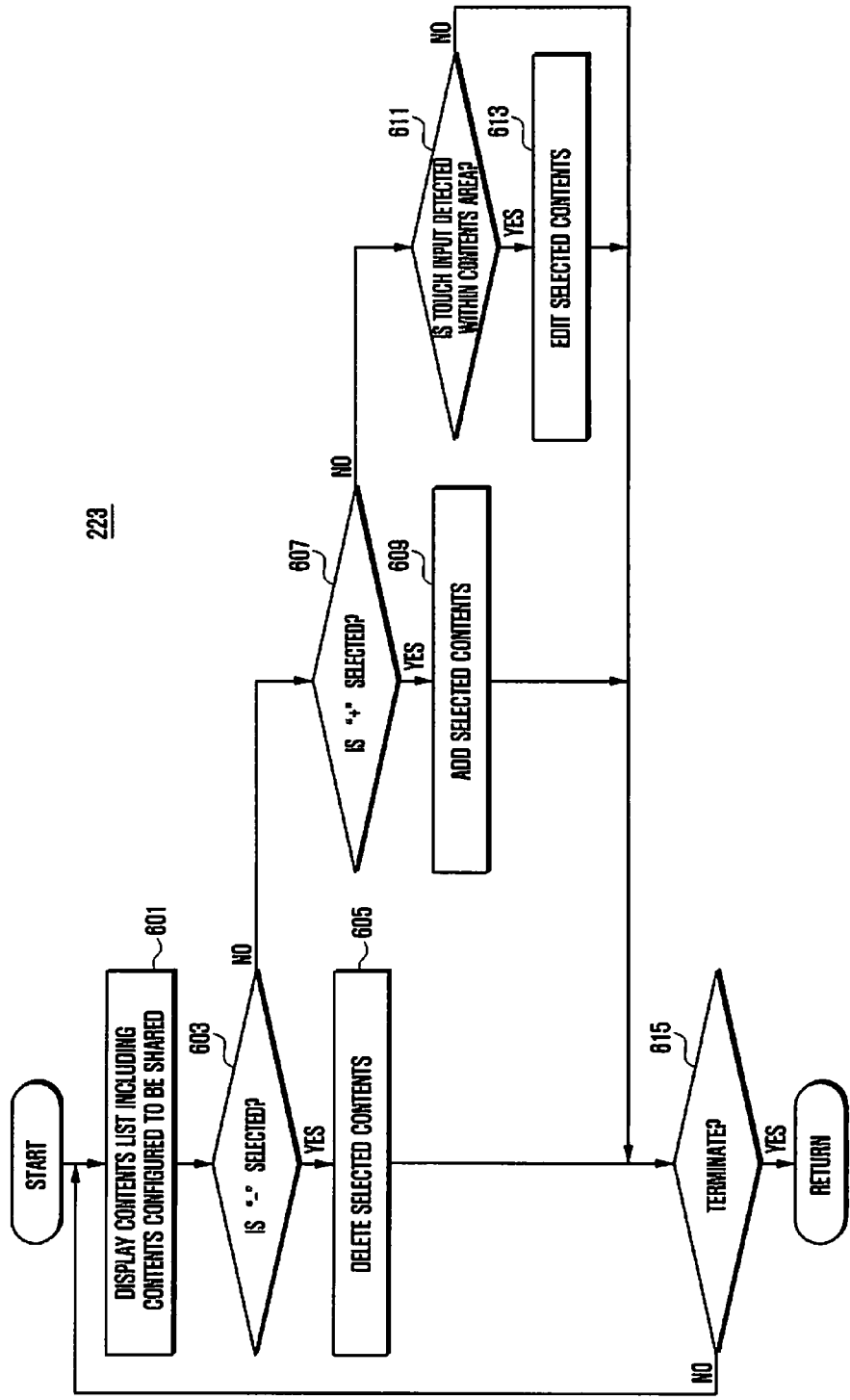
FIG. 6 is a flowchart of a method of deleting, adding, and editing contents according to an embodiment of the present invention.
Figure 7A:
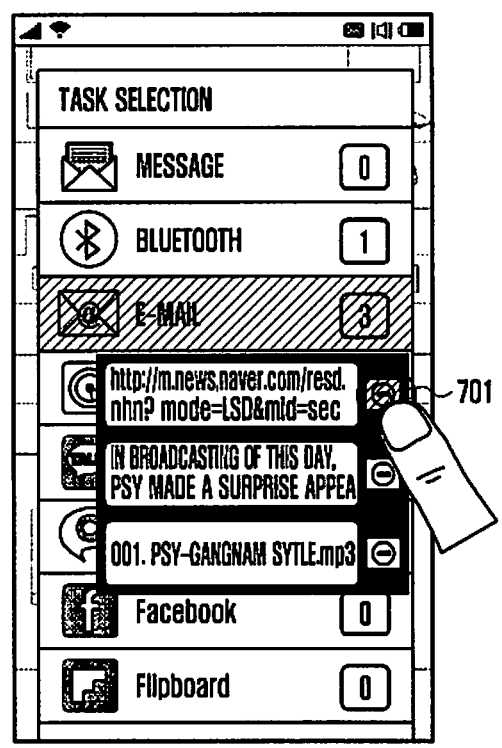
FIGS. 7A to 7C illustrate a method of deleting, adding, and editing contents according to an embodiment of the present invention.
Figure 7B:
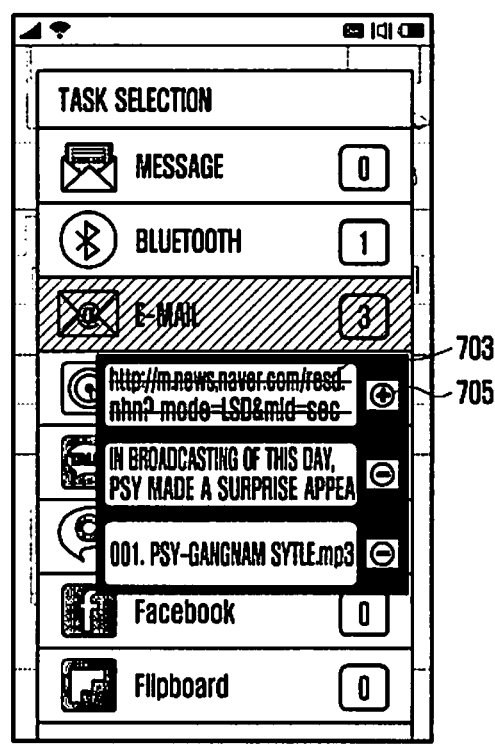
Figure 7C:
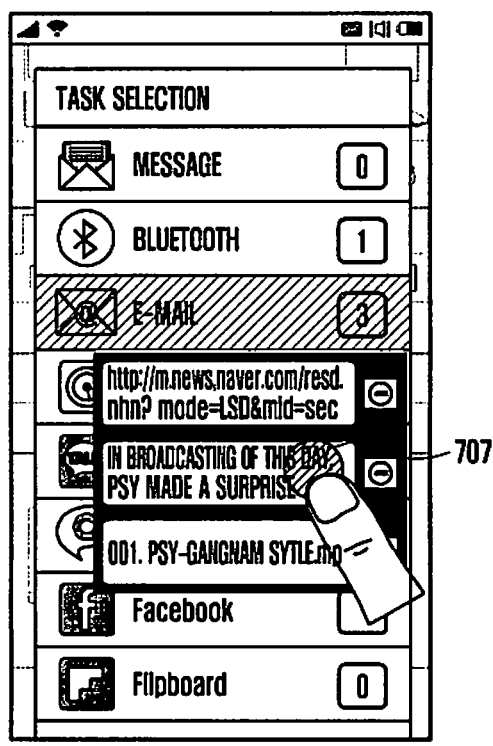

FIG. 6 is a flowchart of a method of deleting, adding, and editing contents according to an embodiment of the present invention. FIGS. 7A to 7C illustrate an example of the method of deleting, adding, and editing contents.

Referring to FIG. 6 and FIGS. 7A to 7C, the controller 140, in step 601, displays the contents list included in a selected application on the display unit 131 as illustrated in FIG. 7A. An adding button (e.g. a "+" button) and a deleting button (e.g. a "−" button) are displayed with contents included in the contents list. The controller 140 adds contents via the adding button. The controller 140 deletes contents via the deleting button.

The controller 140, in step 603, determines whether a touch input is detected in the deleting button (e.g. the "−" button) or the adding button (e.g. the "+" button). If a touch input is detected in the deleting button ("−" button) as in a screen 701 of FIG. 7A, the controller 140, in step 605, deletes contents selected from the contents list of the E-mail application. Furthermore, the deleted contents are displayed with a strike-out line as indicated by reference numeral 703 of FIG. 7B, and the deleting button ("−" button) is changed to the adding button ("+" button) and displayed as indicated by reference numeral 705 of FIG. 7B.

If a touch input is detected in the adding button (e.g. "+"), the controller, in step 609, adds contents selected from the contents list of the E-mail application. Furthermore, the added contents are displayed and the adding button ("+" button) is changed to the deleting button ("−") and displayed.

Further, the controller 140, in step 611, determines whether a touch input is detected within a specific contents area in contents included in the contents list. If a touch input is detected within the contents area as indicated by reference numeral 707 of FIG. 7C, the controller 140, in step 613, edits (e.g. modifies) the contents in which the touch input is detected. In an embodiment of the present invention, at least one operation of adding, deleting, and editing may be performed to the contents before being processed by a selected application.

After deleting, adding or editing the contents, the controller 140, in step 615, detects a command of terminating editing of the contents list. If the terminating command is not detected, the controller 140 branches off to step 601 to display the contents list. If the terminating command is detected, the controller branches off to step 209 of FIG. 2 to share the contents with an application.

Figure 8:
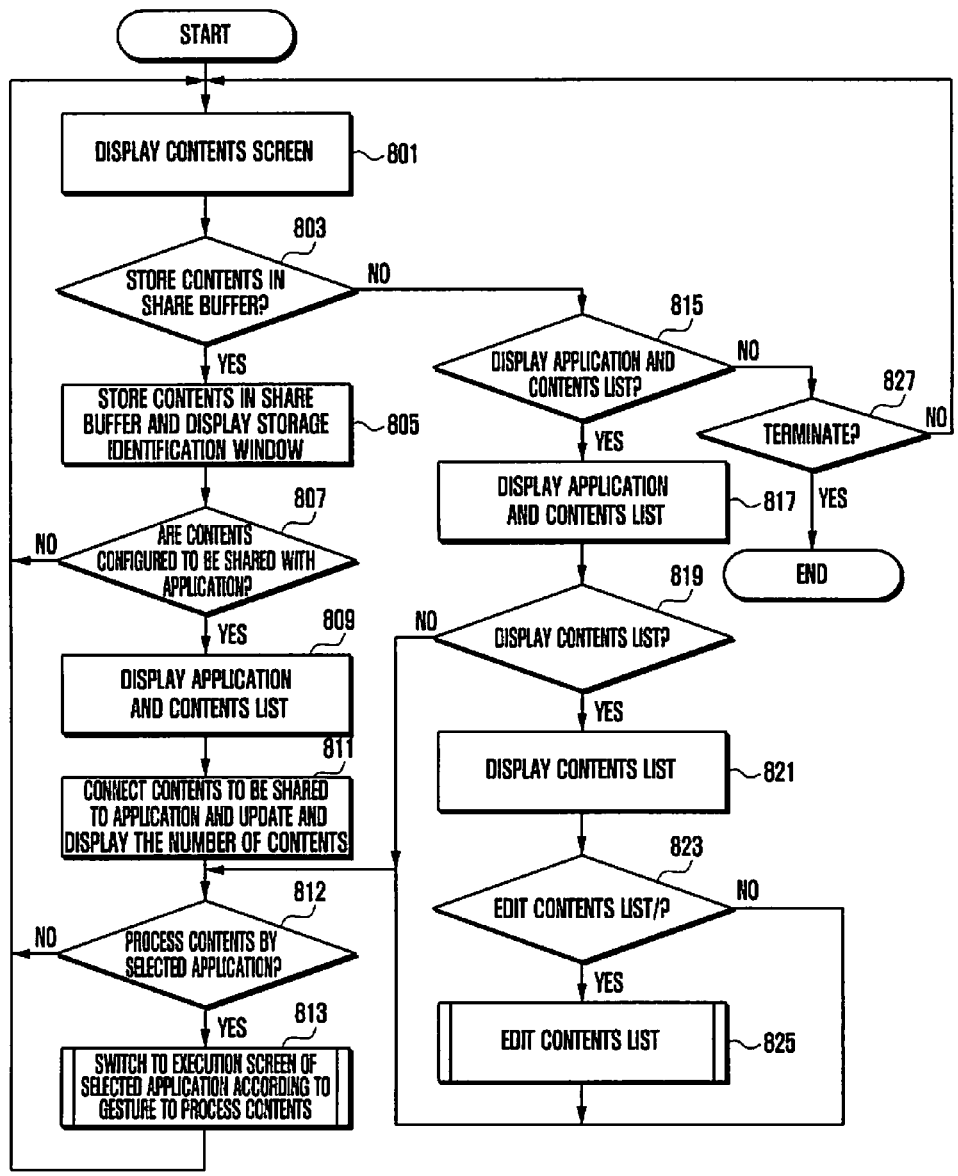
FIG. 8 is a flowchart of a method of sharing contents according to an embodiment of the present invention.

FIG. 8 is a flowchart of a method of sharing contents according to an embodiment of the present invention. FIGS. 9A to 9D illustrate the method of sharing contents according to FIG. 8.

Referring to FIG. 8 and FIGS. 9A to 9D, the controller 140, in step 801, displays a contents screen. The controller 140, in step 803, determines whether an input for storing contents in the share buffer is detected on the contents screen displayed on the display unit 131, via the touch panel 132. The input for storing the contents in the share buffer may correspond to a touch input on the share menu or the share icon. If the input for storing the contents in the share buffer is detected, the controller 140, in step 805, stores the contents in the share buffer, and displays an identification window indicating that the contents are stored in the share buffer, on the display unit 131. In an embodiment of the present invention, the contents may be temporarily stored in the share buffer, and the contents stored in the share buffer may be added to a desired application.

Furthermore, the controller 140, in step 807, determines whether a gesture for sharing contents with an application is detected. If the gesture for sharing the contents is not detected, steps 801 to 805 are repeated. One or more of the contents may be processed via a selected application.

Figure 9A:
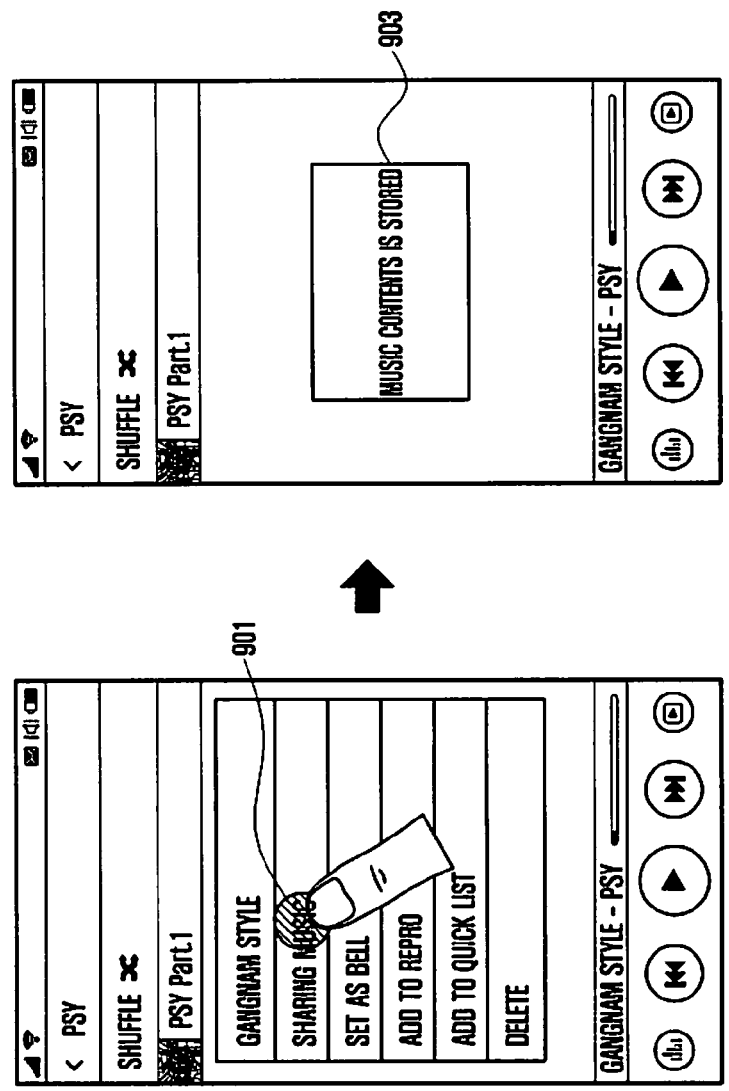
Figure 9B:
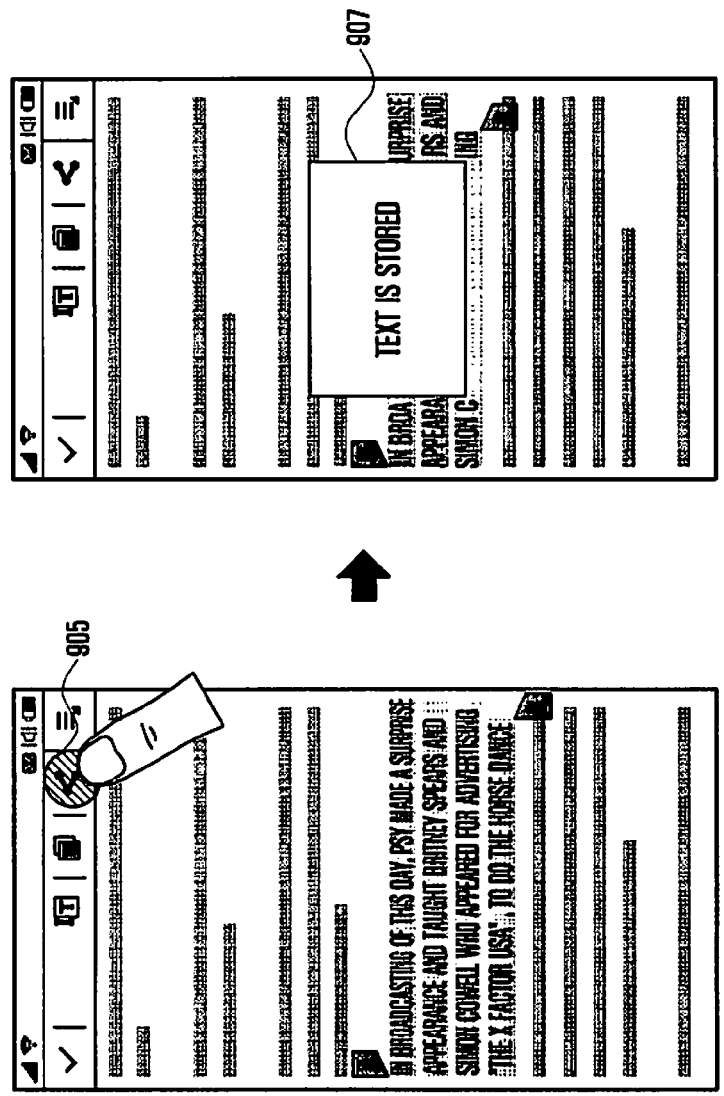

For example, if a touch input is generated in a "music share" item within a menu relating to music contents as indicated by reference numeral 901 of FIG. 9A, the controller 140 stores the music contents in the share buffer and displays a storage identification window as indicated by reference numeral 903. If a touch input is generated in the share icon in a text screen as indicated by reference numeral 905 of FIG. 9B, the controller 140 stores a text in the share buffer and displays a storage identification window as indicated by reference numeral 907. If a touch input is generated in the share icon in a web page screen as indicated by reference numeral 909 of FIG. 9C, the controller 140 stores a web page address in the share buffer and displays a storage identification window as indicated by reference numeral 911.

If a gesture for sharing contents is detected, the controller 140, in step 807, detects the gesture, and, in step 809, displays an application and contents list. The list may be displayed using a drag from the bezel area toward the touch panel 132, a drag from the touch panel 132 toward the bezel, and/or a long press in the share icon, but the present invention is not limited thereto. An embodiment of the present invention is described where the list is displayed if a long press is generated in the share menu and/or the share icon. However, the present invention is not limited thereto. The controller 140 displays the application and contents list on the display unit 131 in response to the long press generated in the share menu and/or the share icon. Furthermore, the controller 140, in step 811, adds contents to be shared to an application in the displayed list and updates and displays the number of added contents. The contents may be added to an application via a drag and drop gesture. If a drag and drop gesture is generated while selecting contents, the controller 140 adds (e.g. shares) the contents to, or with, an application at a location where the contents are dropped, and updates and displays the number of added contents.

Figure 9D:
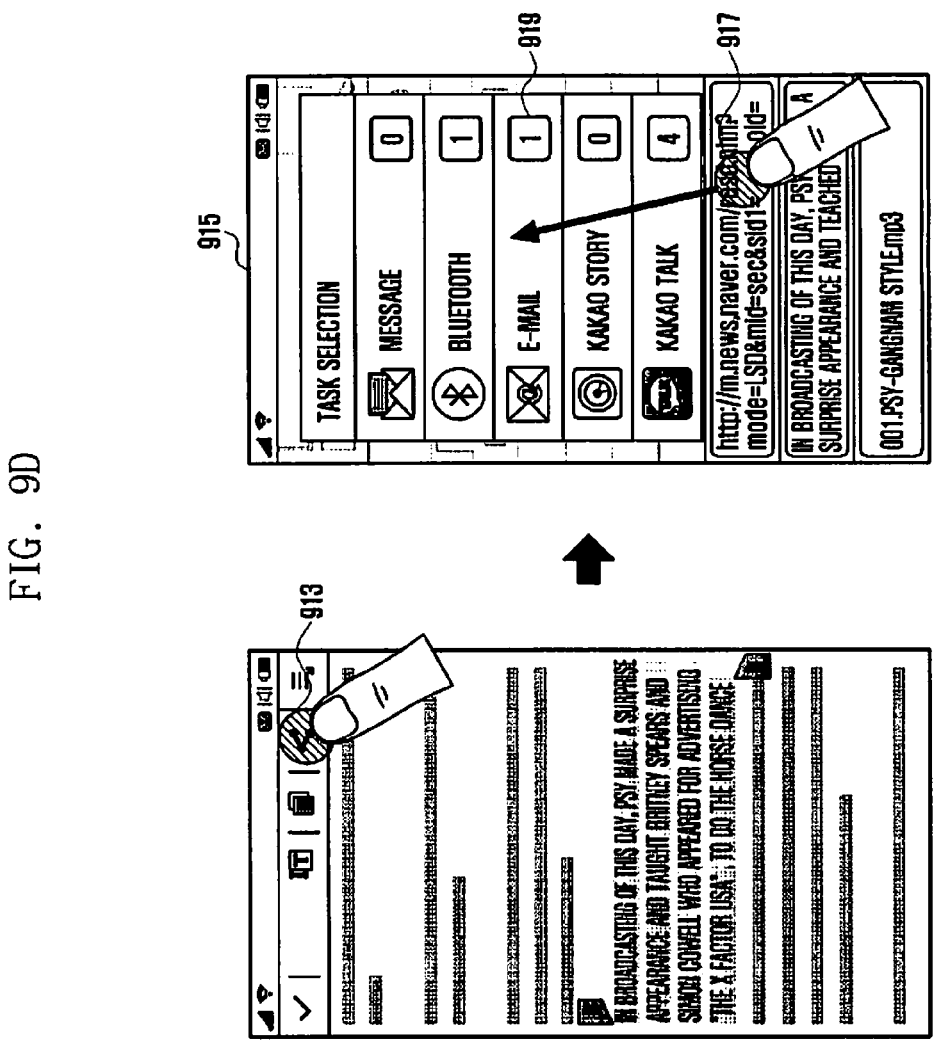

If a long press is detected in the share icon as indicated by reference numeral 913 of FIG. 9D, the controller 140 display the application and contents list as indicated by reference numeral 915. If contents to be shared which are disposed in the contents list displayed on the display unit 131 are dragged and dropped to the application list while being selected as indicated by reference numeral 917 of FIG. 9D, the contents are added to an application at a location where the contents are dropped, i.e., the E-mail application. Furthermore, the contents may be added to another application using the aforementioned method (e.g. the drag and drop gesture). The number of added contents is displayed as indicated by reference numeral 919 of FIG. 9D.

The controller 140, in step 812, determines whether a gesture for processing contents by a selected application is detected. If the gesture for processing the contents is detected, the controller 140, in step 813, switches to an execution screen of the selected application to process the contents. Step 813 may be performed using the steps in FIG. 4. Since step 813 is equal to step 211 of FIG. 2, a detailed description thereof is omitted.

If an input for storing contents in the share buffer is not detected in step 803, the controller 140, in step 815, determines whether a gesture for displaying the application and contents list is detected. The gesture may include a drag from the bezel area toward the touch panel 312 or a drag form the touch panel 132 toward the bezel area. An embodiment of the present invention is described where the application and contents list is displayed if a drag from the upper side to the lower side is generated. However, the present invention is not limited thereto.

The controller 140, in step 819, determines whether a gesture for displaying a contents list including contents configured to be shared is detected on the application and contents list displayed on the display unit 131. If the gesture for displaying the contents list including contents configured to be shared is detected, the controller 140, in step 821, displays the contents list included in a selected application on the display unit 131.

The controller 140, in step 823, determines whether an input for editing the contents list is detected in the displayed contents list via the touch panel 132. If the input for editing the contents list is detected, the controller 140, in step 825, edits the contents list. The editing of the contents lists can be performed via the steps of FIG. 6. Since step 825 is equal to step 223 of FIG. 2, a detailed description thereof is omitted.

As described above, the method and the apparatus for sharing contents of an electronic device 100 have been described with reference to embodiments of the present invention via the description and the accompanying drawings. Although particular terms have been used in the description, the particular terms are only used in a general sense in order to clearly describe the technical contents of the present invention and facilitate understanding of the present invention, and thus the present invention is not limited to the above-described embodiments. That is, it is obvious to those skilled in the art to which the present invention belongs that various changes in form and details may be made therein without departing from the spirit and scope of the present invention as defined by the appended claims and there equivalents.

What is claimed is:

1. A method of sharing contents of an electronic device, the method comprising:
    displaying contents;
    detecting a first touch input for sharing the contents;
    in response to the first touch input for sharing the contents being detected, displaying an application list identifying a plurality of applications for sharing the contents, wherein each item on the application list comprises an application identifier and a number indicator, each number indicator displaying a count of a number of contents stored in a share buffer associated with the item;
    detecting a second touch input for selection of an item in the application list;
    in response to the second touch input for the item in the application list being detected, storing the contents to the selected item's share buffer and incrementing the count of contents stored in the share buffer indicated by the number indicator of the selected item; and
    detecting a gesture on a specific item in the application list; and
    sharing contents in the share buffer corresponding to the specific item, in response to the gesture being detected on the specific item,
    wherein sharing the contents in the share buffer corresponding to the specific item comprises:
        in response to the gesture being detected on a number indicator of the specific item, sharing all of the contents stored in the share buffer corresponding to the specific item via the application of the specific item and decrementing the count of contents indicated by the number indicator to zero; and
        in response to the gesture being detected on an application identifier of the specific item, sharing only the content in the share buffer that was most recently stored in the share buffer corresponding to the specific item via the application and decrementing the count of contents indicated by the number indicator by one.

2. The method of claim 1, further comprising:
    displaying a list of all of the contents to be shared using an application, in response to a gesture for displaying the list of contents being detected on an item corresponding to the application in the application list; and
    editing the list of contents to be shared using the application, by at least one of deleting and editing one of the contents displayed in the list of contents.

3. The method of claim 1, wherein the plurality of applications comprises at least one of an E-mail application, a Multimedia Messaging System (MMS) application, a Social Networking Service (SNS) application, a messenger application, or a device-to-device communication application.

4. The method of claim 3, further comprising:
    in response to the application corresponding to the selected item being the E-mail application, adding the contents to be shared with the application to at least one area of a body text area or an attached file area of the E-mail application.

5. A method of sharing contents of an electronic device, the method comprising:
    displaying contents;
    detecting a first touch input for sharing the contents;
    storing the contents, in response to the first touch input;
    in response to a second touch input being detected, displaying a stored contents list and an application list identifying a plurality of applications for sharing the stored contents, wherein each item on the application list comprises an application identifier and a number indicator, each number indicator displaying a count of a number of contents stored in a share buffer associated with the item;
    in response to a third touch input for selecting an item on the application list being detected after selection of contents in the contents list, storing the selected contents to the selected item's share buffer and incrementing the count of contents stored in the share buffer indicated by the number indicator corresponding to the application;
    detecting a gesture on a specific item in the application list; and sharing contents in the share buffer corresponding to the specific item, in response to the gesture being detected on the specific item, wherein sharing in the share buffer corresponding to the specific item comprises:

in response to the gesture being detected on a number indicator of the specific item, sharing all of the contents stored in the share buffer corresponding to the specific item via the application of the specific item and decrementing the count of contents indicated by the number indicator to zero; and in response to the gesture being detected on an application identifier of the specific item, sharing only the content in the share buffer that was most recently stored in the share buffer corresponding to the specific item via the application and decrementing the count of contents indicated by the number indicator by one.

6. The method of claim 5, wherein storing the selected contents to the selected item's share buffer comprises:

storing the stored contents by a drag and drop gesture.

7. An apparatus for sharing contents of an electronic device, the apparatus comprising:

a touch screen; and a controller configured to:

control the touch screen to display the contents, detect a first input for sharing the contents;

in response to the first touch input for sharing the contents being detected, control the touch screen to display an application list identifying a plurality of applications for sharing the contents, wherein each item on the application list comprises an application identifier and a number indicator, each number indicator displaying a count of a number of the contents stored in a share buffer associated with the item, detect a second touch input for selection of an item in the application list, in response to the second touch input for the item in the application list being detected, store the contents to the selected item's share buffer and increment the count of the contents stored in the share buffer indicated by the number indicator of the selected item, detect a gesture on a specific item in the application list, and share contents stored in one of the share buffers, in response to the gesture being detected on the specific item, wherein the controller is further configured to:

in response to the gesture being detected on a number indicator of the specific item, share all of the contents stored in the share buffer corresponding to the specific item via the application of the specific item and decrement the count of contents indicated by the number indicator to zero; and in response to the gesture being detected on an application identifier of the specific item, share only the content in the share buffer that was most recently stored in the share buffer corresponding to the specific item via the application and decrement the count of contents indicated by the number indicator by one.

8. The apparatus of claim 7, wherein the controller is further configured to:

control the touch screen to display a list of all of the contents to be shared using an application, in response to a gesture for displaying the list of contents being detected on an item corresponding to the application in the application list; and edit the list of contents to be shared using the application by at least one of deleting or editing one of the contents displayed in the list of contents.

9. An apparatus for sharing contents of an electronic device, the apparatus comprising:

a touch screen; and a controller configured to:

control the touch screen to display contents, store the contents, in response to a first touch input for sharing the contents being detected, in response to a second touch input being detected, control the touch screen to display the stored contents and an application list identifying a plurality of applications for sharing the stored contents, wherein each item on the application list comprises an application identifier and a number, each number indicator displaying a count of a number of contents stored in a share buffer associated with the item, in response to a third touch input for selecting an item on the application list being detected after selection of contents in the contents list, store the selected contents to the selected item's share buffer and increment the count of contents stored in the share buffer indicated by the number indicator corresponding to the application, detect a gesture on a specific item in the application list, and share contents in the share buffer corresponding to the specific item, in response to the gesture being detected on the specific item, wherein the controller is further configured to:

in response to the gesture being detected on a number indicator of the specific item, share all of the contents stored in the share buffer corresponding to the specific item via the application of the specific item and decrementing the count of contents indicated by the number indicator to zero; and in response to the gesture being detected on an application identifier of the specific item, share only the content in the share buffer that was most recently stored in the share buffer corresponding to the specific item via the application and decrementing the count of contents indicated by the number indicator by one.

* * * * *